United States Patent [19]

Morcos et al.

[11] Patent Number: 5,677,963
[45] Date of Patent: Oct. 14, 1997

[54] PERFORMANCE ENHANCEMENT OF CLOSED-ENDED MAGNETIC CIRCUITS BY SELECTIVE REMOVAL OF MATERIAL

[75] Inventors: Anthony Charles Morcos, Carlsbad; Anthony Peter Morreale, Bonsall, both of Calif.

[73] Assignee: BEI Electronics, Inc., San Francisco, Calif.

[21] Appl. No.: 420,039

[22] Filed: Apr. 11, 1995

[51] Int. Cl.$^6$ ................................................ H04R 25/00
[52] U.S. Cl. ................................................ 381/199
[58] Field of Search ........................ 381/192, 194, 381/195, 199, 201, 96; 335/222; 310/13

[56] References Cited

U.S. PATENT DOCUMENTS

| | | | |
|---|---|---|---|
| 3,453,400 | 7/1969 | Coen | 381/201 |
| 3,743,870 | 7/1973 | Hunt | 310/13 |
| 4,751,437 | 6/1988 | Gerard | 381/158 |
| 4,808,955 | 2/1989 | Godkin et al. | 335/222 |

FOREIGN PATENT DOCUMENTS

| | | | |
|---|---|---|---|
| 0191700 | 8/1991 | Japan | 381/199 |

OTHER PUBLICATIONS

J. Stupak, Jr. & G. Gogue, "Voice–Coil Actuators: Insight Into the Design," *Intelligent Motion*, Oct. 1989 Proceedings, pp. 241–253.

L. H. McCarty (Western Editor), "Linear Actuator Improves Accuracy/Speed of PCB Drilling," *Design News*, Feb. 12, 1990, pp. 238–239.

Brochure, BEI Motion Systems Company, "Voice Coil Actuators An Applications Guide," Oct. 1992, pp. 1–11.

A. C. Morcos, "Update on Voice Coil Actuators," Feature Report, *Product Design and Development*, Mar. 1994, pp. 59–60.

A. C. Morcos, "A Primer on Magnetic Circuit Design: Materials, Permeance Calculations, and Finite Element Analysis," *Motion*, Jan./Feb. 1993, pp. 3–4, 6, 8, 10, 12 & 14.

*Primary Examiner*—Curtis Kuntz
*Assistant Examiner*—Rexford N. Barnie
*Attorney, Agent, or Firm*—Limbach & Limbach L.L.P.

[57] ABSTRACT

A closed-ended linear voice-coil actuator in which the effects of armature reaction are significantly reduced. The actuator includes a housing formed from longitudinal field plates and end plates which are connected together. A cylindrical or rectangular core of ferromagnetic material is mounted inside the housing with its ends connected to the end plates. Permanent magnets mounted on the field plates are used to produce a transverse magnetic field. A coil of wire is wound around a coil bobbin. The coil of wire and coil bobbin are disposed around the core and are free to move along its length. A coil mounting bracket is mounted to the coil winding to allow the user of the voice-coil actuator to attach a load. A hole is drilled through the core, thereby removing some of the ferromagnetic material of which the core is composed. By placing the hole at the center of the core where the magnetic field due to the permanent magnets is minimal, the field produced by those magnets remains substantially the same. However, the secondary magnetic field produced by the interaction between a current flowing through the coil and the ferromagnetic core is reduced, thereby lessening the effects of armature reaction. In addition, because the physical rigidity of the core is maintained, the structural strength of the device is not compromised.

10 Claims, 7 Drawing Sheets

PERFORMANCE ENHANCEMENT OF CLOSED-ENDED MAGNETIC CIRCUITS BY SELECTIVE REMOVAL OF MATERIAL

TECHNICAL FIELD

The present invention relates to closed-ended magnetic circuits such as linear voice-coil actuators, and in particular, to a design for such devices which compensates for performance losses due to the phenomena of armature reaction.

BACKGROUND OF THE INVENTION

Linear electromagnetic actuators are devices that produce linear mechanical motion in response to the interaction of magnetic and electrical circuits. An example of a linear electromagnetic actuator is a voice-coil actuator, which is a direct drive, limited motion device that utilizes the interaction between a permanent magnet field and a current carrying coil winding to produce a force proportional to the current in the coil. Voice-coil actuators are used in linear and rotary motion applications requiring linear force or torque output and high acceleration or high frequency actuation. Originally used in radio loud speakers, voice-coil actuators are also used in applications where proportional or tight servo control is desired.

The electromechanical conversion principal underlying a voice-coil actuator is described by the Lorentz Force Principle, which describes the force acting upon a current-carrying conductor when it is placed in a magnetic field. The magnitude of this force is a function of the magnetic flux density of the magnet, the current flowing through the conductor, and the orientation of the magnetic field and current vectors. The direction of the force is a function of the direction of the current and magnetic field vectors, and is described by the right-hand rule for the cross-product of two vectors. If current flow is reversed, the direction of the force on the conductor will also reverse. If the magnetic field and the conductor length are constant, as they are in a voice-coil actuator, then the generated force is directly proportional to the magnitude of the input current.

In addition to the Lorentz force, the interaction between a current carrying coil and a magnetic field will also produce a voltage or back EMF across the coil as the coil moves through the field. The magnitude of the voltage depends on the magnetic flux density of the magnet, the length of the conductor, and the speed of the coil as it traverses the magnetic field. The back EMF has the effect of reducing the net current in the coil, and thus requires that greater power be supplied to maintain the current level.

FIG. 1 shows a cross-section view of a typical closed-ended linear voice-coil actuator 10. Housing 12 of actuator 10 includes field plates 14 and end plates 16 which are connected together to form housing 12. Housing 12 is usually made of steel or another suitable ferromagnetic material of high permeability. A core 18 made of steel or another ferromagnetic material is mounted inside housing 12 with its ends 20 connected to end plates 16. Core 18 typically has a circular or rectangular cross-section. A transverse magnetic field is produced by permanent magnets 22 which are mounted on field plates 14 inside housing 12. A coil of wire 26 is wound upon a coil bobbin 23. Coil bobbin 23 is usually made from paper, fiberglass, or aluminum which has been electrically insulated. The coil winding 26 and bobbin 23 are disposed around a portion of core 18 and are free to move along the length of core 18. A coil mounting bracket 24 (shown in a cut-away view in FIG. 1) is attached to coil winding 26 to allow a user of voice-coil actuator 10 to attach a load (not shown). Coil mounting bracket 24 typically has threaded holes drilled in it to facilitate attachment of the user's load. Magnets 22 are arranged so that the magnets "facing" coil 26 are all of the same polarity. Air gap 28 exists in the clearance between coil winding 26 and permanent magnets 22.

When a current flows through coil 26, it interacts with the magnetic field lines produced in air gap 28 by magnets 22. This causes coil 26 to experience an axial force causing it to move along the length of core 18, provided the force is large enough to overcome friction, inertia, and any other forces from loads attached to the coil. The result is to convert the interactions of the electrical and magnetic elements to mechanical motion.

If a typical rectangular linear voice coil actuator (like actuator 10 shown in FIG. 1) is reshaped so that the two ends are bent to form a planar arc, such as a sector of an annulus, a rotary voice coil actuator can be produced. This device can also be referred to as a limited angle torquer or a sector torquer. Its principle of operation and force generation is analogous to that of the linear counterpart; however, ratings are in units of torque, instead of force, because the force is generated along the circumference of an arc.

The voice-coil actuator is a single phase device. Application of a voltage across the two coil leads generates a current in the coil, causing the coil to move axially along the air gap. The direction of movement is determined by the direction of current flow in the coil. The single phase linear voice-coil actuator provides direct, cog-free linear motion which is free from the backlash, irregularity, and energy loss that typically result from converting rotary to linear motion. Rotary versions of voice-coil actuators provide such smooth motion that they are becoming the preferred device in applications requiring quick response and limited angle actuation, such as gimbal assemblies.

FIG. 2 shows the magnetic flux lines of linear voice-coil actuator 10 of FIG. 1 when no current is flowing through coil 26. As indicated in the figure, in the absence of current flowing through coil 26, the flux lines split equally into parallel paths and return to magnets 22 via ferromagnetic core 18 and field plates 14. Note that the core 18 and field plates 14 should be thick enough to efficiently carry the flux produced by magnets 22. If these elements are too thin, they will saturate, and the magnetic field in air gap 28 and consequently the force on coil 26 for a given current level will decrease, thereby degrading the performance of actuator 10. In addition, note that the magnetic field strength produced in air gap 28 by the action of magnets 22 alone, as is the situation when no current is flowing through coil 26, is almost zero at the center of core 18.

FIG. 3 shows how a current flowing through coil 26 disturbs the balance of the flux lines of actuator 10 of FIG. 1. As indicated by FIG. 3, when a current is applied, the flux lines near the location of coil 26 become elongated and the region at which the net magnetic field is approximately zero shifts away from the center of core 18. These changes have the effect of altering the force on coil 26 from what it would be in the absence of the current.

A problem encountered with standard closed-ended linear actuators, such as that shown in FIG. 1, is that the current flowing in coil 26 of the actuator couples through ferromagnetic core 18 to produce its own magnetic field. The secondary magnetic field which is produced by this effect either adds to or subtracts from the magnetic field produced by permanent magnets 22, depending upon the direction of current flow. In the case of voice-coil actuators this phenomena is termed "armature reaction".

When the current in the coil increases, the armature reaction within the device also increases and causes its magnetic circuit to become more unbalanced. This means that at a given coil position, the difference in force or torque levels will become greater as the direction of current flow changes. For example, assume that the coil of a given linear voice-coil actuator is 0.125 inches from its midstroke (center) position. When the coil current is +1.0 amperes, the generated force is found to be +1.05 pounds, while at a current of −1.0 amperes the generated force is found to be −0.95 pounds (0.95 pounds in the opposite direction). When the coil current is increased to +2.0 amperes, the generated force is +2.2 pounds, while at a current of −1.0 amperes, the force is −1.8 pounds. Thus, the force imbalance increases as the current is increased. This is a result of armature reaction. In the absence of armature reaction, the generated forces would be equal in both directions: at a current of +/− 1.0 amperes, the forces would be +/− 1.0 pounds, and at a current of +/− 2.0 amperes, the forces would be +/− 2.0 pounds.

This imbalance arises because the armature reaction either adds to or subtracts from the magnetic field in the air gap. Voice-coil actuators are usually employed in applications where precise force or torque control is required. The imbalance between push and pull forces or between clockwise and counter-clockwise torques complicates the control scheme, and this undesirable symptom of armature reaction can lead to a reduction in actuator efficiency, an increase in the required input power, or an increase in actuator mass.

One suggested method for reducing the problem caused by armature reaction is to split the core 18 of the actuator at its center, creating a gap between the core halves. FIG. 4 shows the magnetic flux lines produced in such a split-core linear voice-coil actuator when a current is flowing through coil 26. As indicated by the figure, the magnetic flux lines are less elongated than those in FIG. 3, and the location where the net magnetic field is minimized is near to its original location. Thus, this design inhibits the secondary magnetic field created by the coupling of the coil to the steel core, thereby lessening the armature reaction. However, this approach has several disadvantages which are related to the manufacturing process and structural integrity of such a device.

The replacement of a single piece of steel with two cantilevered beams severely compromises the mechanical integrity of the unit and can cause unwanted structural resonances. This design also exposes potentially sharp edges and machining burrs to the air gap where they can inhibit the movement of the mounting bracket and coil and cause device failure. These problems can be lessened by filling the gap between the two steel beams with a non-ferromagnetic material. However, this does not eliminate all of the structural problems caused by the design.

What is desired is a design for a closed-end linear actuator which reduces the effects of armature reaction, and which does not introduce manufacturing problems or structural weaknesses into the device.

SUMMARY OF THE INVENTION

The present invention is directed to a closed-ended linear voice-coil actuator in which the effects of armature reaction are significantly reduced. The actuator includes a housing formed from longitudinal field plates which are connected at the ends by end plates. A cylindrical or rectangular core of ferromagnetic material is mounted inside the housing with its ends connected to the end plates. Permanent magnets mounted on the field plates are used to produce a transverse magnetic field. A coil mounting bracket is disposed around a portion of the core and is free to move along its length. A coil of wire is wound around the mounting bracket. A hole is drilled through the core, thereby removing some of the ferromagnetic material of which the core is composed. By placing the hole at the center of the core where the magnetic field due to the permanent magnets is minimal, the field produced by those magnets remains approximately the same. However, the secondary magnetic field produced by the interaction between a current flowing through the coil and the ferromagnetic core is reduced, thereby lessening the effects of armature reaction. In addition, because the physical rigidity of the core is maintained, the structural strength of the device is not compromised and unwanted structural resonances are not introduced.

DETAILED DESCRIPTION OF THE PREFERRED EMBODIMENT

Figure 5:
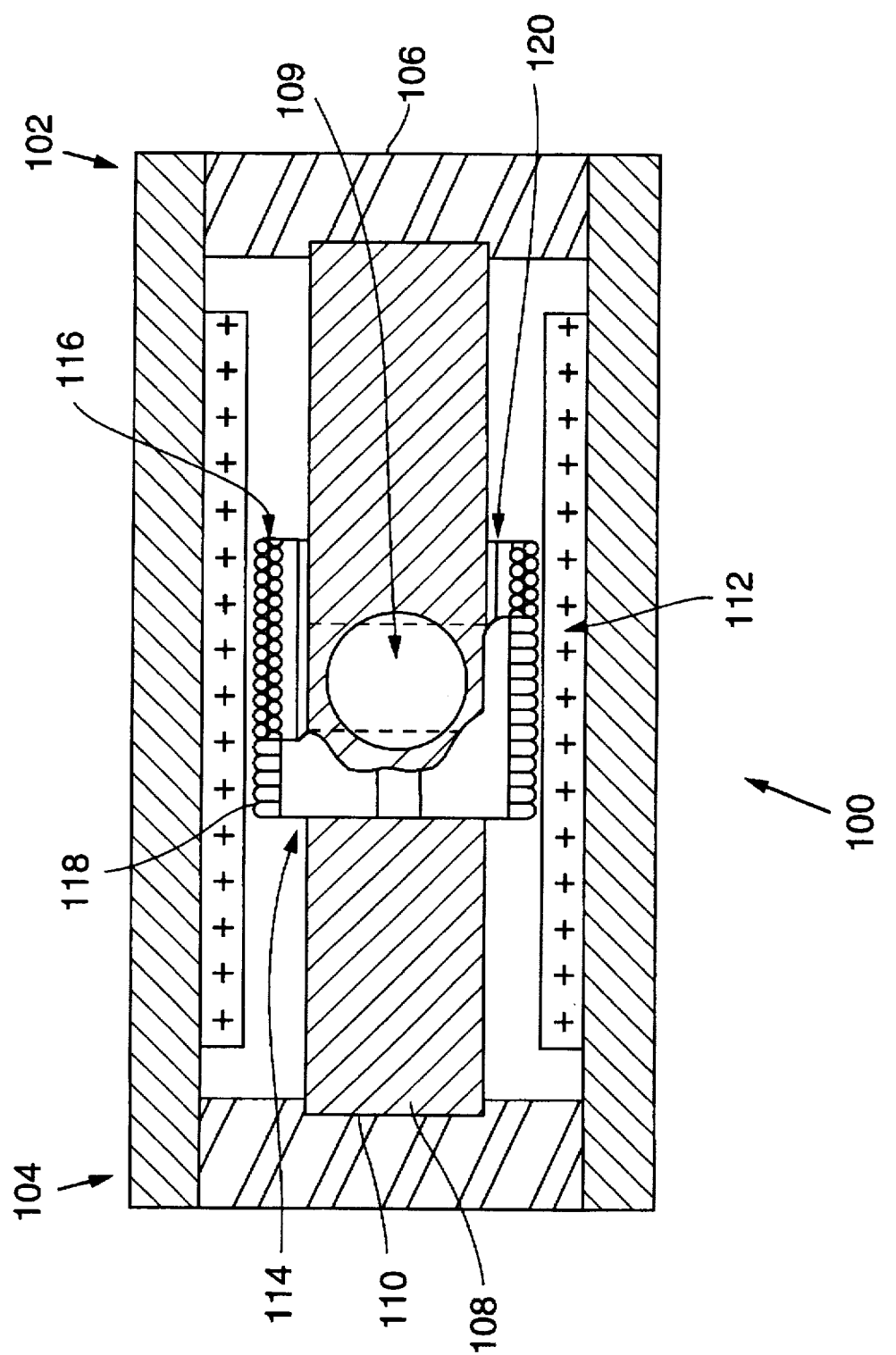
FIG. 5 is a cross-section view of a first embodiment of the linear voice-coil actuator of the present invention.

FIG. 5 is a cross-section view of the closed-ended linear voice-coil actuator 100 of the present invention. Housing 102 of actuator 100 includes field plates 104 which are connected at their ends by end plates 106. Housing 102 is usually made of steel or another suitable ferromagnetic material. A core 108 of steel or another ferromagnetic material is mounted inside housing 102 with its ends 110 connected to end plates 106. A transverse magnetic field is produced by permanent magnets 112 which are mounted on field plates 104 inside housing 102. Although permanent magnets are the preferred means for producing the magnetic field, other suitable means may also be used. A coil of wire 116 is wound upon a coil bobbin 120. Bobbin 120 is usually made of paper, fiberglass, or aluminum which has been electrically insulated. Coil winding 116 and coil bobbin 120 are disposed around a portion of core 108 and are free to move along the length of core 108. A coil mounting bracket 114 (shown in a cut-away view in the figure) is attached to coil winding 116 to allow a user of voice-coil actuator 100 to attach a load (not shown). Coil mounting bracket 114 typically has threaded holes drilled through it to facilitate attaching the user's load. Magnets 112 are arranged so that the magnets "facing" coil 116 are all of the same polarity. Air gap 118 exists in the clearance between coil winding 116 and permanent magnets 112.

Figure 1:
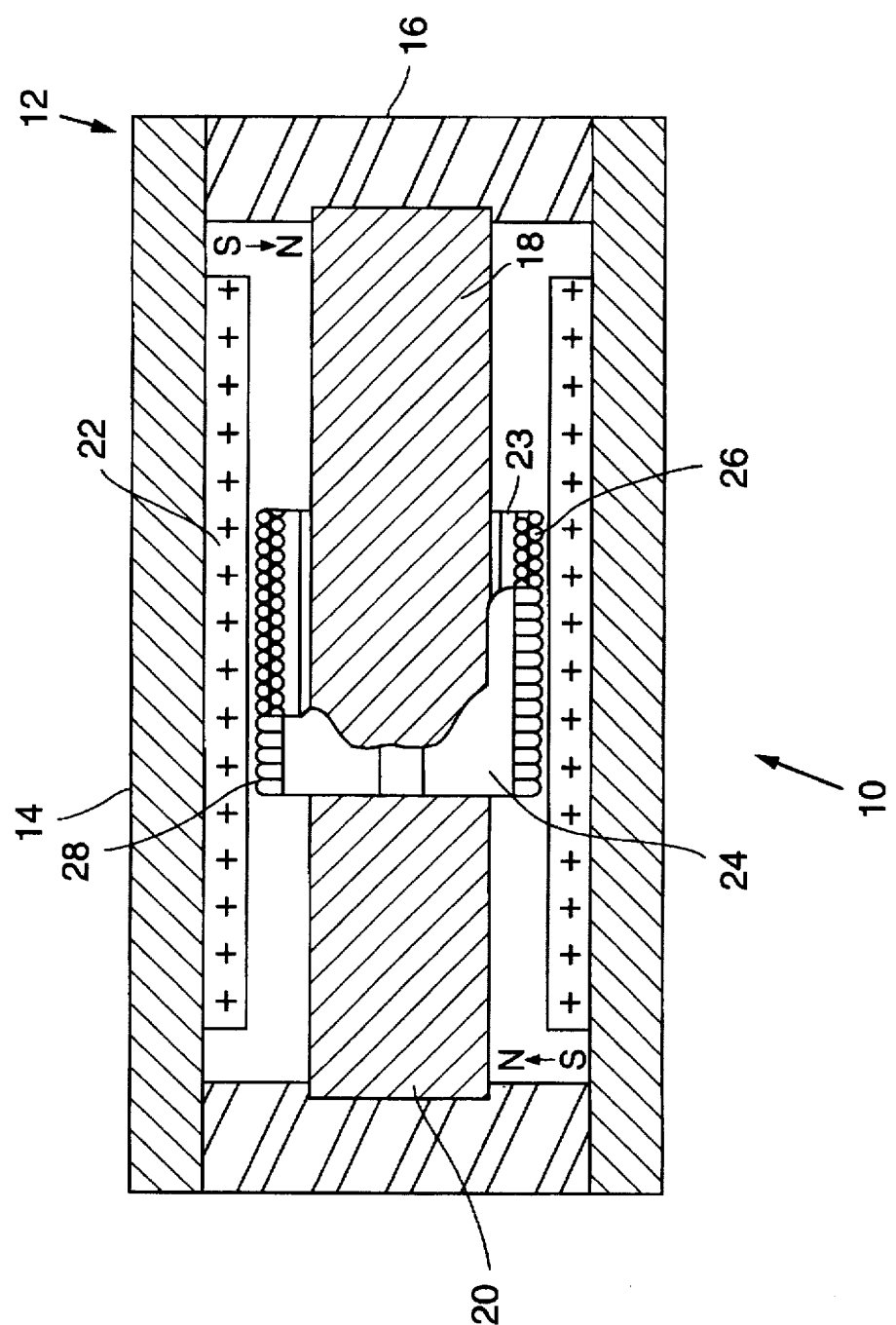
FIG. 1 is a cross-section view of a typical closed-ended linear voice coil actuator.
Figure 2:
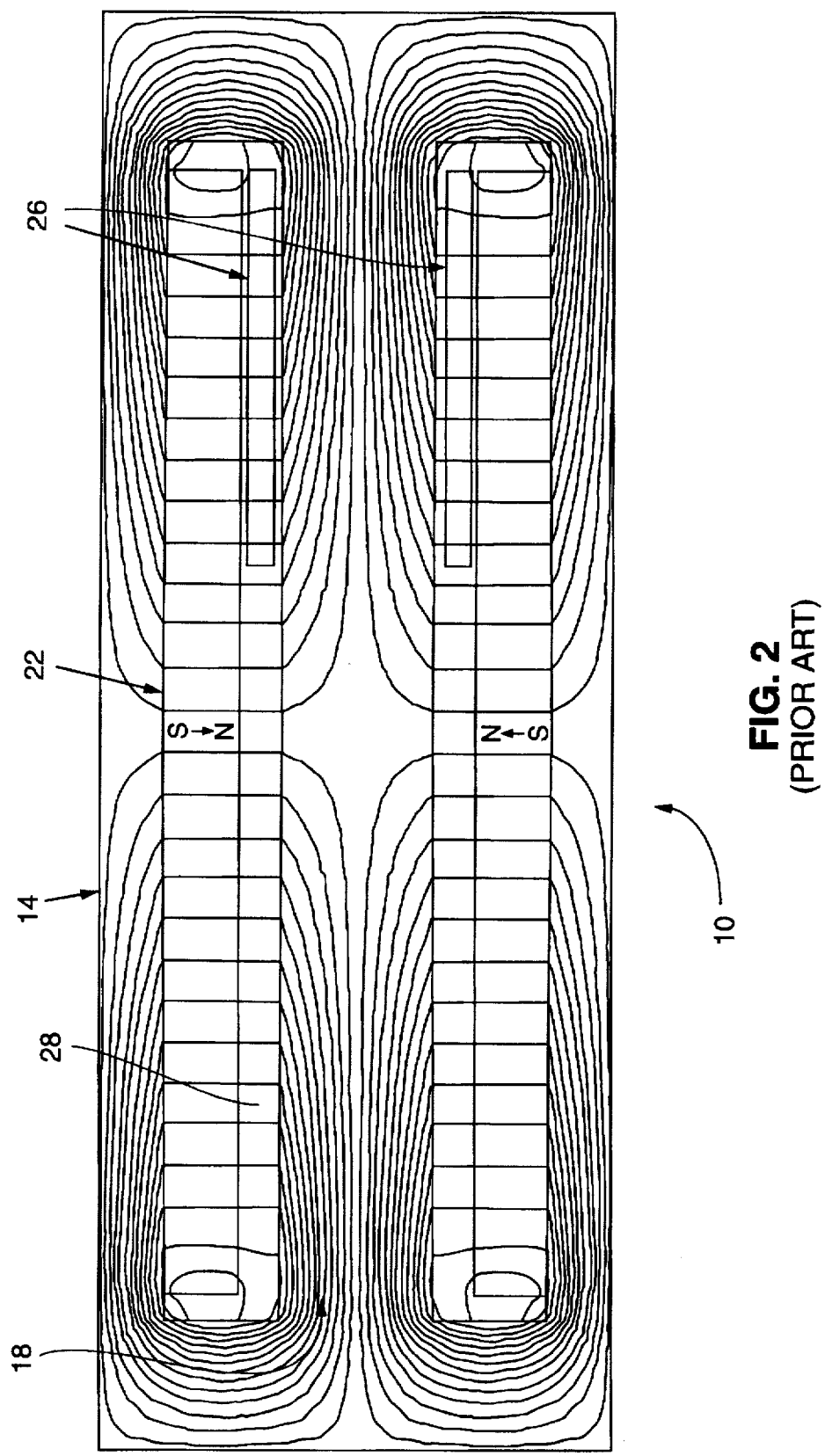
FIG. 2 shows the magnetic flux lines of the linear actuator of FIG. 1 when no current is flowing through the coil.
Figure 3:
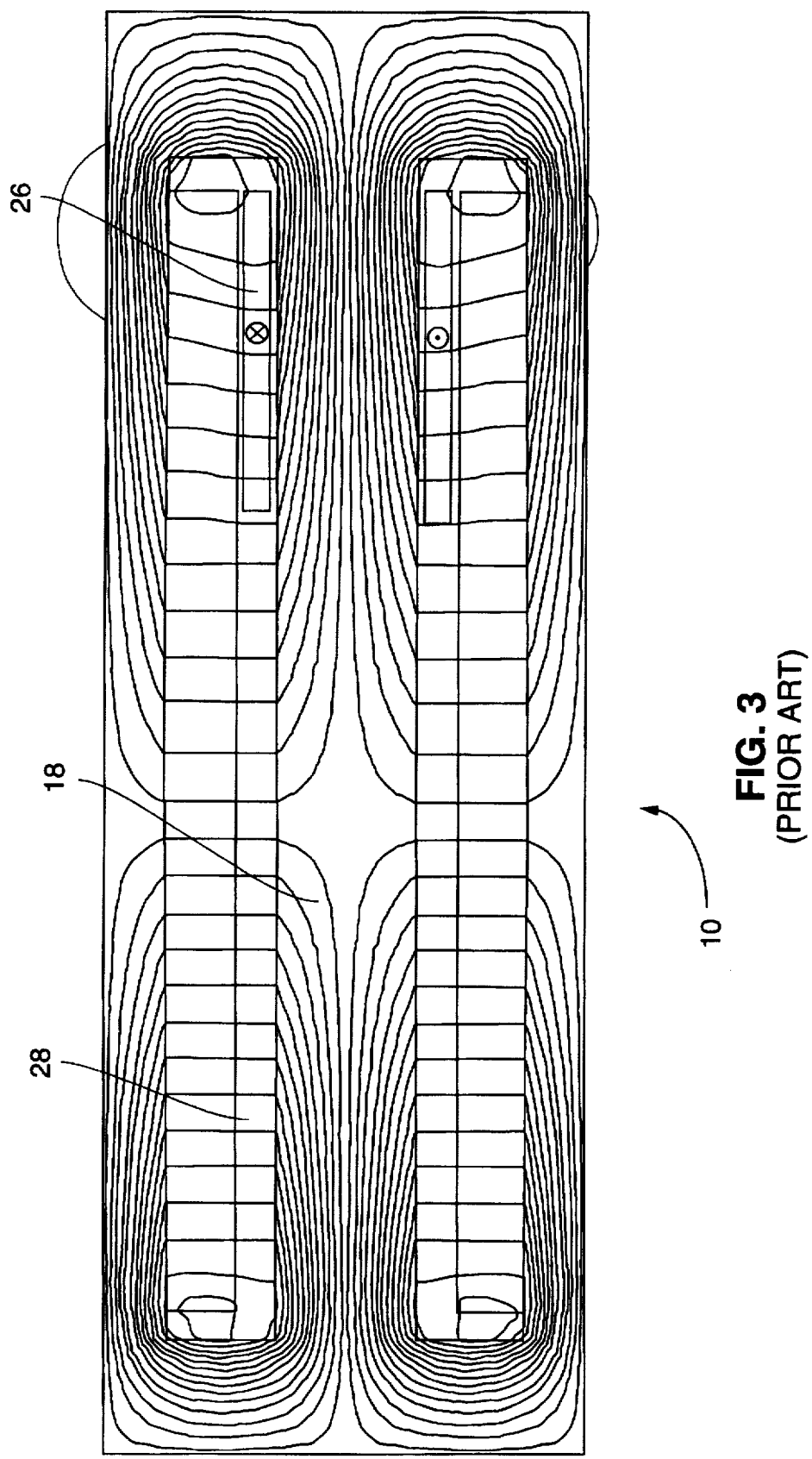
FIG. 3 shows how a current flowing through the coil of the linear actuator of FIG. 1 disturbs the balance of the magnetic flux lines.
Figure 4:
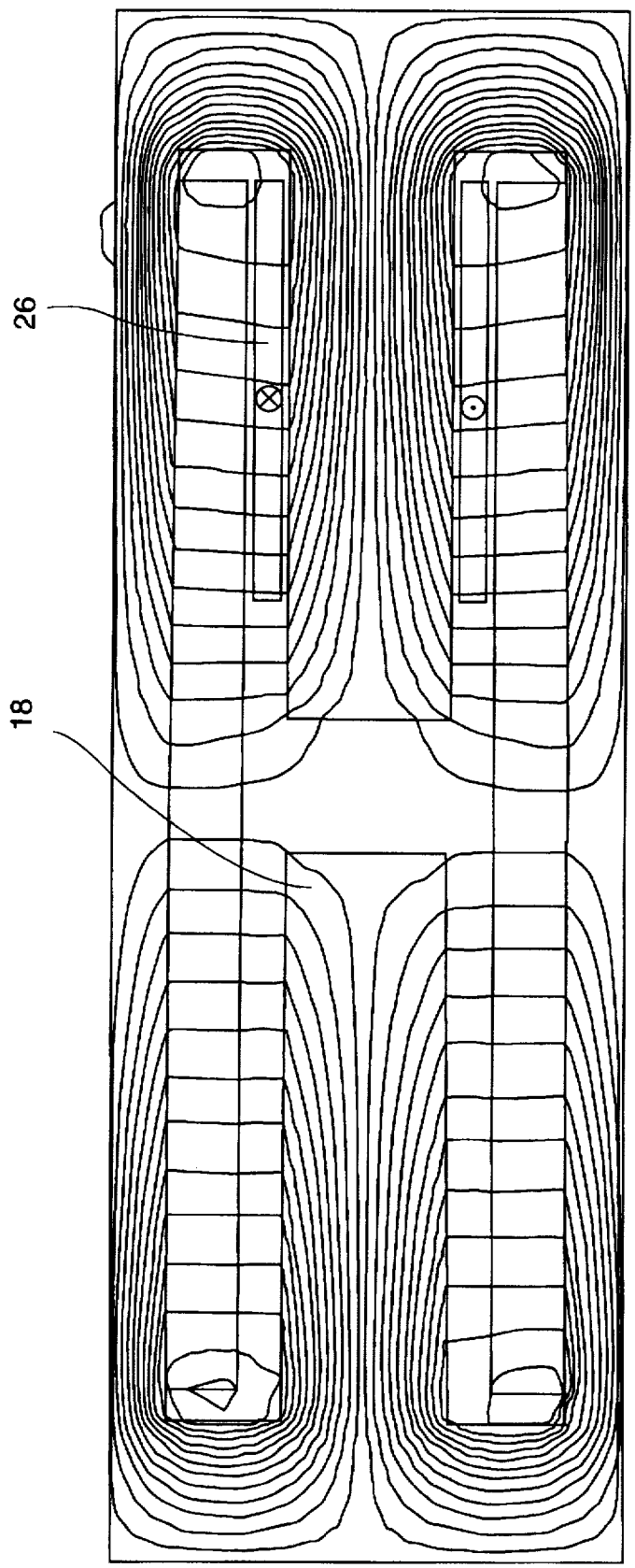
FIG. 4 shows the magnetic flux lines of a split-core linear voice-coil actuator which reduces the effects of armature reaction.

However, in contrast with the prior art and in accordance with the present invention, core 108 is not a solid body but instead has a hole 109 bored through it. Hole 109 may be of a circular cross-section or any other readily machinable shape. Hole 109 serves to remove some of the ferromagnetic material of which core 108 is composed. This has the effect of decreasing the strength of the secondary magnetic field produced by coil winding 116 through the armature reaction mechanism, thereby limiting the magnitude of the performance imbalance of actuator 100 which would otherwise occur. The creation of hole 109 also has the beneficial effect of reducing the weight of actuator 100. As the weight of the device can sometimes be an important consideration in a system, this is another desirable feature of the present invention. The actuator design of FIG. 5 also has the benefit of not introducing structural weak points, as does the split core design of FIG. 4. Similarly, the resonant frequencies of the core are kept higher than would occur in the case of splitting the bar into two beams, and this can further enhance the structural integrity.

In the preferred embodiment, hole 109 is located at the center of core 108. This is desirable because such a placement will have minimal impact on the magnetic field produced by magnets 112, because, as previously noted, the magnetic field produced by magnets 112 alone is almost zero at the center of core 108. Note that hole 109 can also be oriented in a direction perpendicular to that shown in FIG. 5, as indicated by the hidden lines in that figure.

Figure 6:
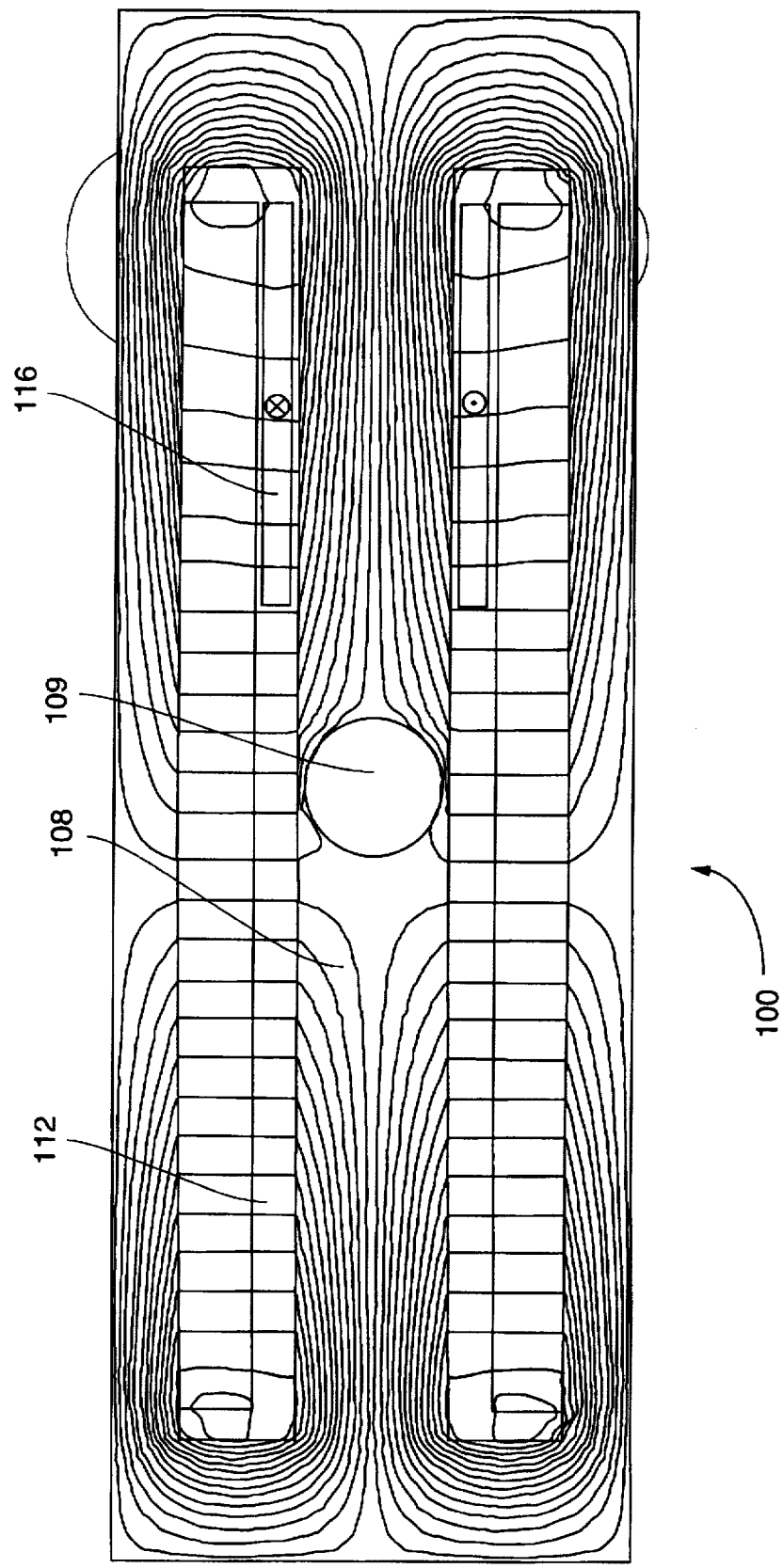
FIG. 6 shows the magnetic flux lines of the linear voice-coil actuator of FIG. 5 when a current is flowing through the coil.

FIG. 6 shows the magnetic flux lines of linear voice-coil actuator 100 of FIG. 5 when a current is flowing through coil 116. As indicated by the figure, the effect of hole 109 in core 108 is to increase the reluctance of the magnetic path for the secondary magnetic field produced by the interaction of coil 116 and core 108. This increased reluctance serves to choke off the flow of the armature reaction magnetic field caused by the coupling of the coil current to core 108, while having a negligible effect on the main magnetic field produced by magnets 112. By choking off the armature reaction by means of hole 109, the force or torque imbalance of the actuator is minimized. This results in a more controllable and efficient device.

Figure 7:
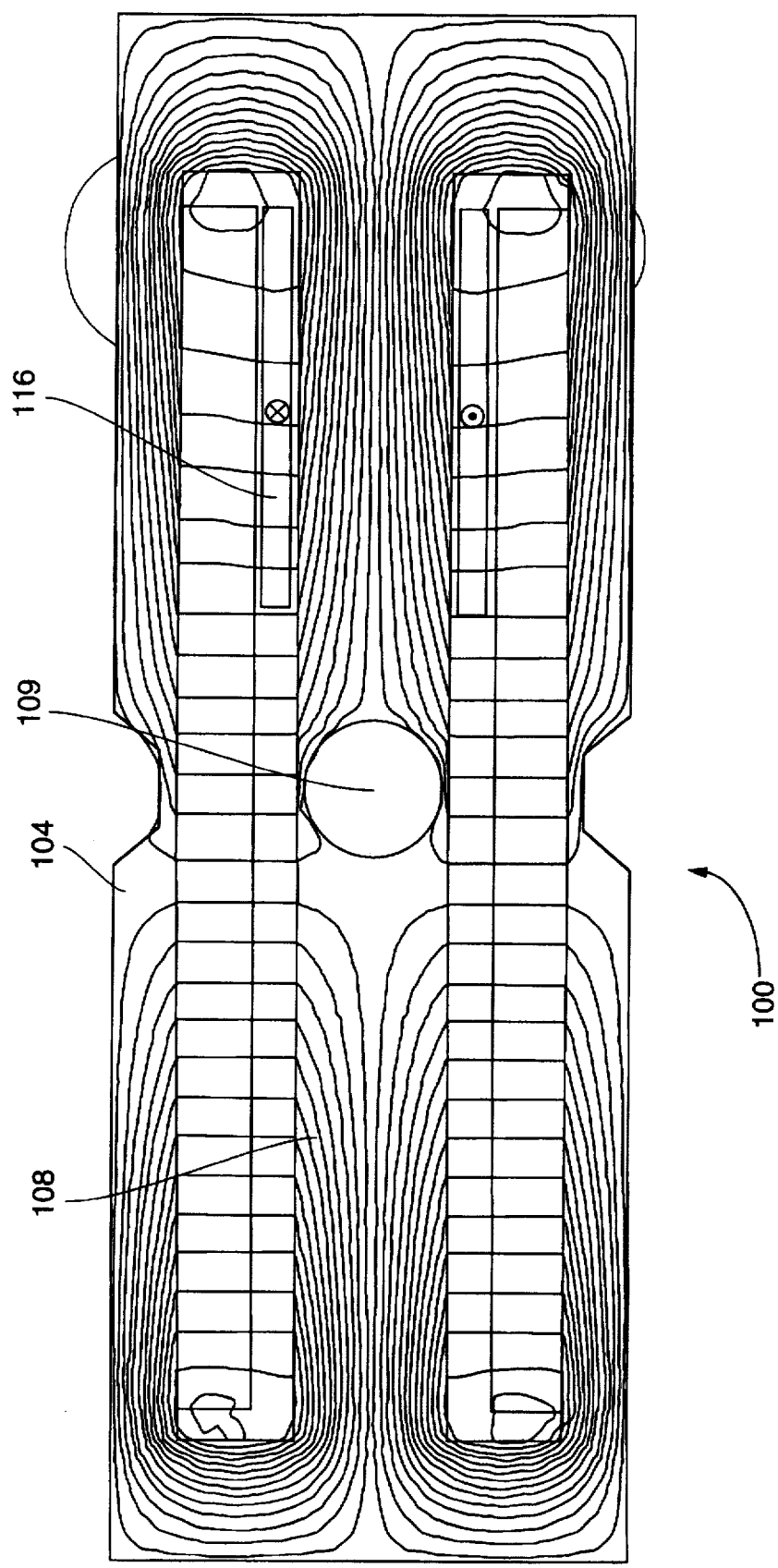
FIG. 7 shows the magnetic flux lines of a second embodiment of the linear voice-coil actuator of the present invention when a current is flowing through the coil.

FIG. 7 shows the magnetic flux lines of a second embodiment 100 of the linear voice-coil actuator of the present invention when a current is flowing through coil 116. In this embodiment, material is selectively removed from field plates 104 as well as from core 108. This provides an additional reduction in the armature reaction by further increasing the reluctance of the magnetic path for the secondary magnetic field produced by the interaction of coil 116 and core 108, and by more effectively choking off the armature reaction.

Depending upon the application, hole 109 can be filled with a variety of non-ferromagnetic materials. If the structural integrity of actuator 100 is of the foremost importance, epoxy and/or fiberglass can be used to fill hole 109 and/or the voids in field plates 104.

Filling the empty spaces with non-ferromagnetic, electrically conductive metals can have advantages in electrodynamic applications where the coil current changes or cycles rapidly. The conductive filler can be configured to provide a shorted turn within the magnetic circuit. The shorted turn will serve to reduce the effective coil inductance, thereby lowering the coil's electrical time constant and allowing for faster transient response of the actuator.

Many applications of actuators require some type of feedback sensor to aid in controlling the position, speed, force, and temperature of the coil within the magnetic circuit. These sensors can be placed in hole 109, so long as they are relatively immune to electromagnetic interference (EMI). In this regard, optical and thermal sensors would be particularly well suited for use with the present invention.

The ability to cool the coil winding is often the limiting factor in the performance capabilities of voice-coil actuators. Hole 109 in the steel center core 108 can be used as a location for either liquid cooling lines, heat pipes, or vent holes through which forced air can be blown over the coil winding. The voids in field plates 104 can also be similarly employed to help keep the magnets cool. With the increasing use of the highly temperature-sensitive permanent magnet alloy Nd—Fe—B, magnet-cooling schemes will become more important. The present invention is well suited for use under such conditions.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

We claim:

1. A closed-ended linear voice-coil actuator having a design which compensates for performance reductions due to armature reaction, the actuator comprising:

a housing formed from first and second spaced-apart end plates and a plurality of field plates connected to the first and second end plates;

a core having two ends and contained within the housing, the core being attached at one end to the first end plate and at the other end to the second end plate, wherein the core has a hole bored through it in a direction along an axis perpendicular to a longitudinal axis of the core;

means for forming a magnetic field inside the housing, wherein the magnetic field is oriented substantially perpendicularly to the longitudinal axis of the core;

a coil of wire wound upon a coil bobbin, the coil of wire and coil bobbin disposed around the core and capable of movement along the length of the core; and a coil mounting bracket attached to the coil of wire, whereby a current flowing in the coil interacts with the magnetic field inside the housing to cause a force to be placed on the coil, the coil bobbin, and the coil mounting bracket, thereby causing the coil, coil bobbin, and the coil mounting bracket to move inside the housing in a direction perpendicular to the axis of the holed bored in the core.

2. The closed-ended linear voice-coil actuator of claim 1, wherein the core is a ferromagnetic material of high permeability.

3. The closed-ended linear voice-coil actuator of claim 2, wherein the ferromagnetic material is steel.

4. The closed-ended linear voice-coil actuator of claim 1, wherein the means for forming a magnetic field inside the housing is a permanent magnet disposed on a field plate inside the housing.

5. The closed-ended linear voice-coil actuator of claim 1, wherein the hole in the core is placed at the center of the core.

6. The closed-ended linear voice-coil actuator of claim 1, wherein the hole in the core is filled with a non-ferromagnetic material.

7. The closed-ended linear voice-coil actuator of claim 1, further comprising:

a sensor for determining the position of the coil, wherein the sensor is disposed in the hole in the core.

8. The closed-ended linear voice-coil actuator of claim 1, further comprising:

a sensor for determining the temperature of the coil, wherein the sensor is disposed in the hole in the core.

9. The closed-ended linear voice-coil actuator of claim 1, further comprising:

means for cooling the coil during the operation of the actuator.

10. The closed-ended linear voice-coil actuator of claim 9, wherein the means for cooling the coil is partially disposed in the hole in the core.

* * * * *